Dec. 11, 1928.
C. W. STEVENS
1,694,403
ADJUSTABLE PLUG VALVE
Filed Feb. 20, 1926
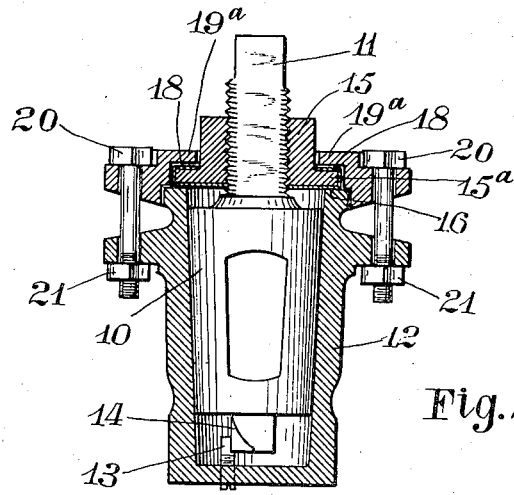
Fig.2.
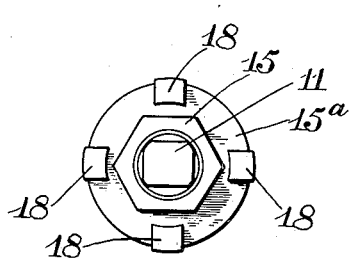
Fig.6.
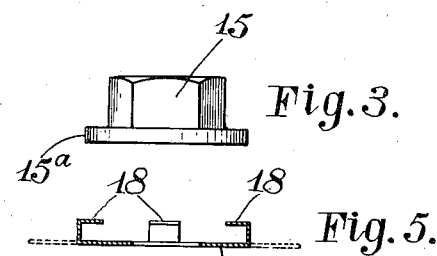
Fig.3.
Fig.5.
Fig.4.
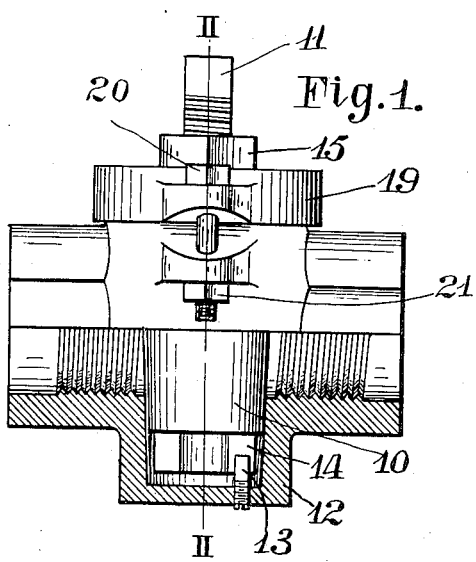
Fig.1.
Inventor
CHARLES W. STEVENS
his Attorneys Patented Dec. 11, 1928.

1,694,403

UNITED STATES PATENT OFFICE.

CHARLES W. STEVENS, OF COLUMBUS, OHIO.

ADJUSTABLE-PLUG VALVE.

Application filed February 20, 1926. Serial No. 89,570.

The principal object of this invention is to provide improved means whereby the plug portion of a rotary valve may be raised or lowered so that the fit of the plug can be nicely regulated or the plug can be released in case it sticks. Other objects of the invention will appear from the disclosure herein.

The invention is embodied in the example herein shown and described, the features of novelty being finally claimed.

In the accompanying drawing—

Figure 1 is a view looking at the side of the structure according to the invention, the upper portion being in elevation and the lower portion in section.

Fig. 2 is a section of the device on the line II—II Fig. 1.

Fig. 3 is an edge view of the plug adjusting nut.

Fig. 4 is a top plan view of the washer carried by the nut.

Fig. 5 is a section on the line V—V Fig. 4.

Fig. 6 is a top plan view of the assembled nut and washer as they appear on the stem of the plug, the casing and cap omitted.

In the views 10 designates the tapered and ported plug or key, it having formed therewith a threaded spindle flattened longitudinally on opposite sides, as shown at 11.

12 designates the valve casing or connection provided with an appropriate socket containing a seat for the plug and a suitable stop pin 13 at the bottom engaged by lugs 14 on the lower end of the plug to limit the rotation of the plug to open and closed positions.

15 designates a nut threaded to properly engage the threaded stem of the plug, said nut having at its lower end a circular flange 15ᵃ. Carried by the nut is a washer 16 provided centrally with a hole 17 having straight sides 17ᵃ to engage the flats of the threaded shank to prevent the washer from turning on the threaded shank when the nut is turned to raise or lower the plug as hereinafter explained. The washer is provided with several tongues 18 adapted to be bent up around the flange to couple the washer to the nut so that when the nut is raised or lowered on the threaded stem the washer is carried with it.

19 designates a cap provided centrally with a circular opening large enough to receive the nut and permit it to turn thereon. This cap is secured to the casing or connection by means of bolts and nuts as shown at 20 and 21 respectively, engaging suitable ears on the cap and casing respectively. The cap around its central opening is formed as a lip 19ᵃ that overlies the flange of the nut and the flange of the nut is large enough to lie over the upper end of the wall of the casing forming the socket constituting the seat of the plug.

The operation is this: When the nut is turned in one direction as to press the plug down it eventually presses against the lip 19ᵃ which forms a purchase forcing the plug downward, and when the nut is turned in the opposite direction it eventually presses downward against the upper end of the casing wall which forms a purchase for drawing the plug upward. In these operations it will be remembered that the nut when turned turns in the washer, the latter being held from turning by the flats of the plug screw which moves in an axial direction only. The plug can be turned to open or closed position with respect to the gas or water passage in the casing by applying a wrench or suitable handle to the upper squared end of the screw stem thereof and this turning does not affect the position of the nut with respect to the stem, the washer, when the plug and its stem are turned, turning with the nut as before suggested and thereby leaving the nut in its adjusted position.

It will be noted that when the stem is turned to open or close the valve, the washer 16, being keyed to the stem, prevents the nut from changing its position on the stem because, when the stem is thus turned, it carries with it both the nut and the washer. When the washer contacts with either of the stationary parts the friction is all on the turning washer and not on the nut the latter being left where adjusted, either up or down, on the stem.

The forms of the parts can be changed without departing from the gist of the invention as claimed.

What I claim is:

In combination with a valve casing having a tapered valve seat, a rotary plug therein having a threaded stem, a cap for the casing having an inwardly standing lip, a nut on said stem having a flange extending under said lip and above the upper end of the casing, a washer engaged with the stem to turn therewith and extending around the rim and over both faces of the flange of the nut, said washer adapted to engage said lip of the cap when the plug is depressed to its seat by the stem, and to engage the upper end of the casing when the plug is raised by turning the nut.

CHARLES W. STEVENS.